US010819457B1

(12) United States Patent
Alaburda et al.

(10) Patent No.: US 10,819,457 B1
(45) Date of Patent: Oct. 27, 2020

(54) INTERFERENCE MITIGATION BETWEEN CELLULAR AND FREQUENCY-MODULATED COMMUNICATION SUBSYSTEMS IN A PORTABLE COMMUNICATION DEVICE

(71) Applicant: MOTOROLA SOLUTIONS, INC., Chicago, IL (US)

(72) Inventors: Richard Alaburda, Sunrise, FL (US); Javier Alfaro, Miami, FL (US); Mark A. Boerger, Plantation, FL (US); Dennis A. Byk, Ft. Lauderdale, FL (US); Eilon Eyal, Kibbutz Dafna (IL); Ruben A. Leon, Margate, FL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 16/526,453

(22) Filed: Jul. 30, 2019

(51) Int. Cl.
*H04H 40/72* (2008.01)
*H04B 15/02* (2006.01)
*H04B 1/12* (2006.01)
*H04W 84/04* (2009.01)
*H04B 1/10* (2006.01)

(52) U.S. Cl.
CPC ........... *H04H 40/72* (2013.01); *H04B 1/1081* (2013.01); *H04B 1/126* (2013.01); *H04B 15/02* (2013.01); *H04W 84/042* (2013.01)

(58) Field of Classification Search
CPC ...... H04H 40/72; H04B 1/1081; H04B 1/126; H04B 15/02; H04B 1/0475; H04B 1/19; H04B 2001/1072; H04B 84/042

USPC ....... 455/12.1, 13.1, 63.1, 114.2, 180.1, 296, 455/297, 552.1, 552.2, 513, 553.1; 381/3
See application file for complete search history.

(56) References Cited

U.S. PATENT DOCUMENTS

| | | | |
|---|---|---|---|
| 5,778,024 A * | 7/1998 | McDonough | H04W 88/06 375/216 |
| 6,011,320 A * | 1/2000 | Miyamoto | B60R 25/24 180/287 |
| 2004/0204038 A1* | 10/2004 | Suzuki | H04W 88/06 455/553.1 |

(Continued)

*Primary Examiner* — Vivian C Chin
*Assistant Examiner* — Friedrich Fahnert
(74) *Attorney, Agent, or Firm* — Michael Best and Friedrich, LLP

(57) ABSTRACT

Portable communication device and method for mitigating interference. One example portable communication device includes a frequency-modulated (FM) communication subsystem, a cellular communication subsystem, a first electronic processor, and a second electronic processor. The FM communication subsystem includes an FM modem and at least one FM antenna. The cellular communication subsystem includes a plurality of cellular antennas, a plurality of antenna tuners, and a cellular modem. The first electronic processor is configured to generate an alert signal responsive to detecting one of an audio signal reception by the FM communication subsystem and an audio signal transmission by the FM communication subsystem. The second electronic processor is configured to receive the alert signal from the first electronic processor. The second electronic processor is also configured to responsively cause the cellular communication subsystem to set substantially constant impedances for the plurality of cellular antennas.

20 Claims, 3 Drawing Sheets

(56) References Cited

U.S. PATENT DOCUMENTS

| | | | | |
|---|---|---|---|---|
| 2011/0287820 A1* | 11/2011 | Harrison | ............ | H04M 1/0274 |
| | | | | 455/575.7 |
| 2013/0196643 A1* | 8/2013 | Medapalli | ........... | H04W 72/044 |
| | | | | 455/418 |
| 2013/0287012 A1* | 10/2013 | Pragada | ................ | H04W 76/22 |
| | | | | 370/338 |
| 2014/0256247 A1* | 9/2014 | Wietfeldt | ................ | H04W 4/00 |
| | | | | 455/39 |
| 2017/0324484 A1* | 11/2017 | Saada | .................... | H04B 15/02 |
| 2018/0361711 A1 | 12/2018 | Andreani et al. | | |
| 2019/0238239 A1* | 8/2019 | Laughlin | ............. | H04B 17/101 |

* cited by examiner

INTERFERENCE MITIGATION BETWEEN CELLULAR AND FREQUENCY-MODULATED COMMUNICATION SUBSYSTEMS IN A PORTABLE COMMUNICATION DEVICE

BACKGROUND OF THE INVENTION

Portable communication devices can include multiple communication subsystems, each of which may be configured to communicate with a particular wireless communication network. For example, a portable communication device can include both a frequency-modulated (FM) communication subsystem and a cellular communication subsystem. Impedance changes of antennas in the cellular communication subsystem caused, for example, by band changes may impact reception and transmission of audio signals by the FM communication subsystem.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
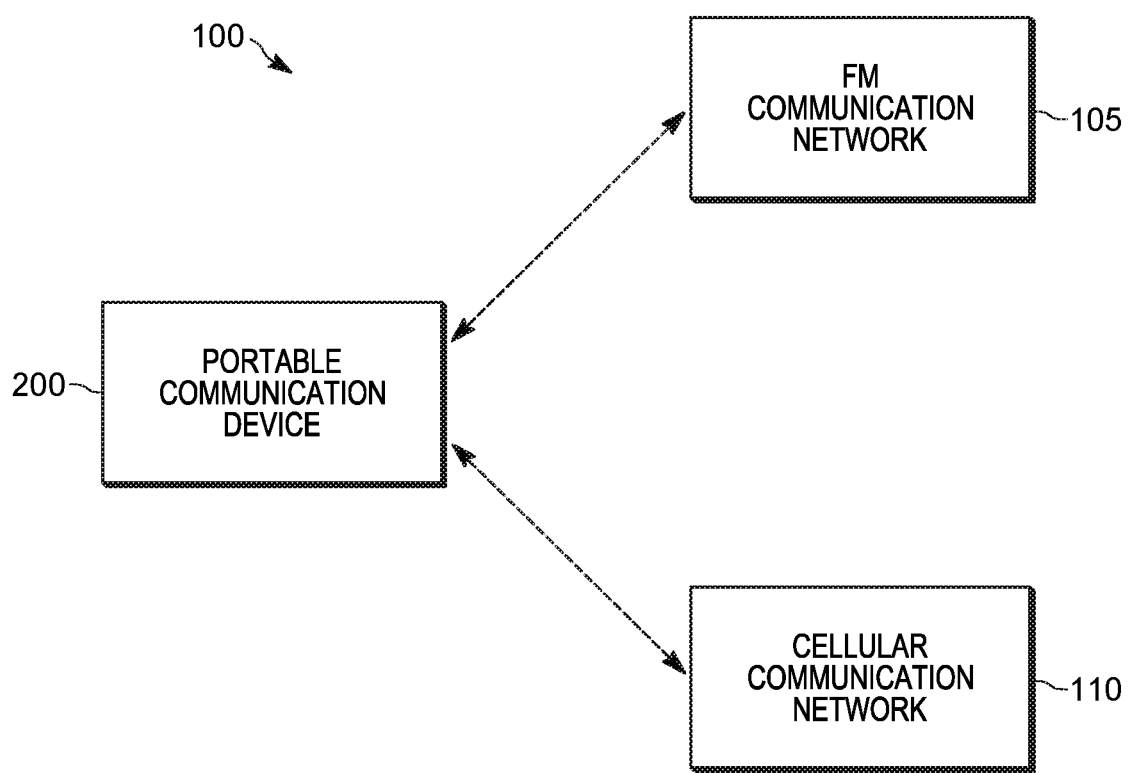
FIG. 1 is a block diagram of an example of a multiple network system interacting with a portable communication device.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

As mentioned above, a portable communication device can house both an FM communication subsystem and a cellular communication subsystem in a single housing. Other types of communication and computing devices may also house both an FM communication subsystem and a cellular communication subsystem in a single housing. Because the FM and cellular communication subsystems are housed in a single housing, an FM antenna in the FM communication subsystem may be affected by impedance changes of cellular antennas in the cellular communication subsystem. For example, impedances changes of the cellular antennas can cause unwanted impedance changes of the FM antenna. During audio signal reception, these unwanted impedance changes of the FM antenna are demodulated by the FM communication subsystem and heard as audio ticks. In addition, these unwanted impedance changes of the FM antenna negatively affect audio signal transmission by the FM communication subsystem.

To prevent unwanted impedance changes of the FM antenna, one solution may be to increase spatial antenna isolation. However, mechanical constraints generally make implementing such an option impractical. Accordingly, embodiments described herein provide, among other things, a device and method for interference mitigation between cellular and FM communication subsystems.

One embodiment provides a portable communication device including, in one example, an FM communication subsystem, a cellular communication subsystem, a first electronic processor, and a second electronic processor. The FM communication subsystem includes an FM modem and at least one FM antenna that is coupled to the FM modem. The cellular communication subsystem includes a plurality of cellular antennas, a plurality of antenna tuners, and a cellular modem. The plurality of antenna tuners are coupled to the plurality of cellular antennas. The cellular modem is coupled to the plurality of antenna tuners. The first electronic processor is coupled to the FM modem and is configured to generate an alert signal responsive to detecting at least one selected from a group consisting of an audio signal reception by the FM communication subsystem and an audio signal transmission by the FM communication subsystem. The second electronic processor is coupled to the first electronic processor and the cellular modem. The second electronic processor is configured to receive the alert signal from the first electronic processor. The second electronic processor is also configured to responsively cause the cellular communication subsystem to set substantially constant impedances for the plurality of cellular antennas to mitigate interference between the cellular communication subsystem and the FM communication subsystem.

Another embodiment provides a method for controlling a portable communication device that includes an FM communication subsystem and a cellular communication subsystem. In one example, the method includes detecting, by a first electronic processor of the portable communication device, at least one selected from a group consisting of an audio signal reception by the FM communication subsystem and an audio signal transmission by the FM communication subsystem. The method also includes responsively generating, by the first electronic processor, an alert signal. The method further includes receiving, by a second electronic processor from the first electronic processor, the alert signal. The method also includes responsively causing, by the second electronic processor, the cellular communication subsystem to set substantially constant impedances for a plurality of cellular antennas included in the cellular communication subsystem to mitigate interference between the cellular communication subsystem and the FM communication subsystem.

Another embodiment provides a portable communication device including, in one example, an FM communication subsystem, a cellular communication subsystem, a first electronic processor, and a second electronic processor. The FM communication subsystem includes an FM modem and at least one FM antenna that is coupled to the FM modem. The cellular communication subsystem includes a plurality of cellular antennas, a plurality of antenna tuners, and a cellular modem. The plurality of antenna tuners are coupled to the plurality of cellular antennas. The cellular modem is coupled to the plurality of antenna tuners. The first electronic processor is coupled to the FM modem and is configured to generate an alert signal responsive to detecting at least one selected from a group consisting of a signal reception by the FM communication subsystem and a signal transmission by the FM communication subsystem. The second electronic processor is coupled to the first electronic processor and the cellular modem. The second electronic processor is configured to receive the alert signal from the first electronic processor. The second electronic processor is also configured to responsively cause the cellular communication subsystem to set substantially constant impedances for the plurality of cellular antennas to mitigate interference between the cellular communication subsystem and the FM communication subsystem.

For ease of description, some or all of the example systems presented herein are illustrated with a single example of each of its component parts. Some examples may not describe or illustrate all components of the systems. Other example embodiments may include more or fewer of each of the illustrated components, may combine some components, or may include additional or alternative components.

FIG. 1 is a block diagram of an example of a multiple communication network system 100. FIG. 1 shows one example of a network in which the invention may be implemented. This example is for illustrative purposes only and the invention may be implemented on other networks. In the example shown, the multiple communication network system 100 includes an FM communication network 105 and a cellular communication network 110. In some embodiments, the FM communication network 105 is a land-mobile radio (LMR) network and the cellular communication network 110 is a Long-Term Evolution (LTE) communication network. In some embodiments, the multiple communication network system 100 includes more than one of the FM communication network 105 and the cellular communication network 110. Also, one skilled in the art would understand that the networks are more complex than the schematic elements shown in FIG. 1 depict.

In the example shown in FIG. 1, a portable communication device 200 communicates with the FM communication network 105 and the cellular communication network 110. The portable communication device 200 may be a converged device that incorporates components (for example, hardware and software) to permit communications via two or more modalities. For example, the converged device may independently communicate with the FM communication network 105, the cellular communication network 110, or additional communication networks. The portable communication device 200 may also be a tablet computer, a personal digital assistant (PDA), or another computing device.

Figure 2:
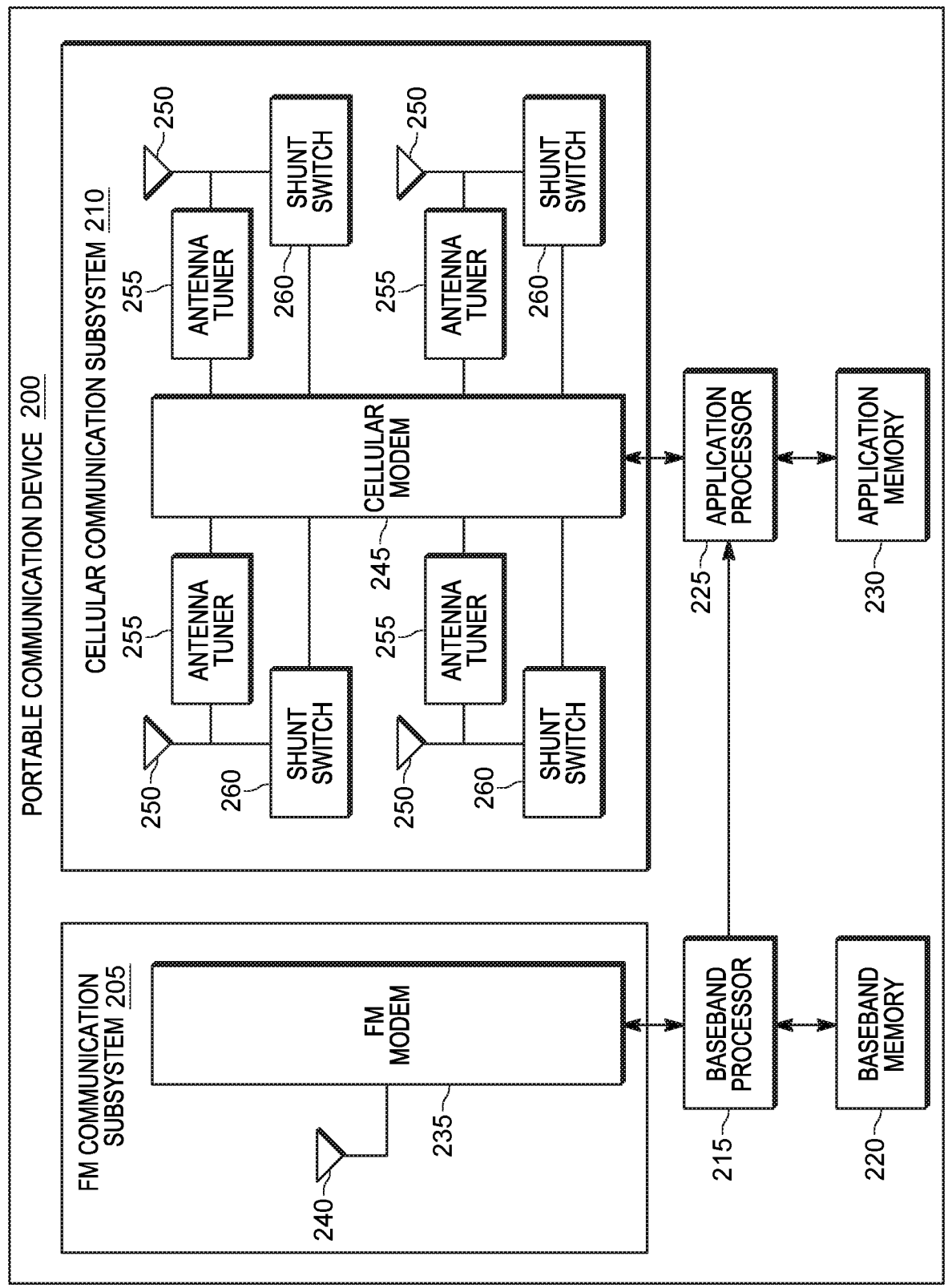
FIG. 2 is a block diagram of an example of an embodiment of a portable communication device capable of being used in the multiple network system of FIG. 1.

FIG. 2 is a block diagram of one example of an embodiment of the portable communication device 200. For ease of description, although the portable communication device 200 understandably includes more components (for example, speakers, microphones, electronic processors, memory and other storage elements, transceivers, codecs, signal processing components, and so on), only those relevant in describing the invention are described in detail herein. The portable communication device 200 illustrated in FIG. 2 includes an FM communication subsystem 205, a cellular communication subsystem 210, a baseband processor 215, a baseband memory 220, an application processor 225, and an application memory 230. Each of the FM communication subsystem 205 and the cellular communication subsystem 210 are configured to operate according to a particular radio communication protocol. For example, the FM communication subsystem 205 is configured to communicate over the FM communication network 105 and the cellular communication subsystem 210 is configured to communicate over the cellular communication network 110.

The FM communication subsystem 205 may send and receive analog signals, digital signals, or both. In some embodiments, the FM communication subsystem 205 includes a land-mobile radio (LMR) communication subsystem operating for example, in the 7/800 MHz bands, in the VHF bands, or the in UHF bands. In some embodiments, the cellular communication subsystem 210 includes a long-term evolution (LTE) communication subsystem.

The FM communication subsystem 205 illustrated in FIG. 2 includes an FM modem 235 and an FM antenna 240. In the embodiment illustrated in FIG. 2, the FM communication subsystem 205 includes only a single antenna. In alternate embodiments, the FM communication subsystem 205 may include more than one antenna. For ease of description, although the FM communication subsystem 205 understandably includes more components (for example, transceivers, codecs, signal processing components, and so on), only those relevant in describing the invention are described in detail herein.

The cellular communication subsystem 210 illustrated in FIG. 2 includes a cellular modem 245, a plurality of cellular antennas 250, a plurality of antenna tuners 255, and a plurality of shunt switches 260. In the embodiment illustrated in FIG. 2, the cellular communication subsystem 210 includes four antennas. In alternate embodiments, the cellular communication subsystem 210 may include more or less than four antennas. In some embodiments, the cellular communication subsystem 210 does not include the plurality of shunt switches 260. In alternate embodiments, the plurality of shunt switches 260 may be included in the plurality of antenna tuners 255. For ease of description, although the cellular communication subsystem 210 understandably includes more components (for example, transceivers, codecs, signal processing components, and so on), only those relevant in describing the invention are described in detail herein.

The plurality of cellular antennas 250 includes antennas configured to operate in different frequency bands. For example, the plurality of cellular antennas 250 may include low-band antennas, mid-band antennas, and high-band antennas. In some embodiments, in addition to, or as an alternative to, including both mid-band antennas and high-band antennas, the plurality of cellular antennas 250 may include dedicated mid-band/high-band antennas. In some embodiments, the plurality of cellular antennas 250 includes main and diversity LTE antenna pairs, where each LTE antenna pair is configured to operate in a different LTE band. For example, the plurality of cellular antennas 250 may include pluralities of main and diversity LTE low-band antenna pairs (an example of "low-band antennas"), main and diversity LTE mid-band antenna pairs (an example of "mid-band antennas"), and main and diversity LTE high-band antenna pairs (an example of "high-band antennas"). In some embodiments, one or more of the plurality of cellular antennas 250 may be used with both the cellular communication subsystem 210 and another communication subsystem included in some embodiments of the portable communication device 200 (e.g., Bluetooth, Wi-Fi, and Global Navigation Satellite System). For example, the one of the plurality of cellular antennas 250 may be used for both LTE communication and Bluetooth communication.

The plurality of antenna tuners 255 are coupled to the plurality of cellular antennas 250 and the cellular modem 245. The plurality of antenna tuners 255 are configured to act as impedance transformers between the plurality of cellular antennas 250 and the cellular modem 245. In other words, each of the plurality of antenna tuners 255 is configured to transform the load impedance of the cellular modem 245 to the input impedance of one of the plurality of cellular antennas 250. Each of the plurality of antenna tuners 255 can provide a plurality of different transformed impedance values (referred to herein as "tuning states."). The tuning state for each of the plurality of antenna tuners 255 is controlled by control signals from the cellular modem 245, the application processor 225, or both. Tuning states for each of the plurality of antenna tuners 255 may be selected based on current transmission characteristics of the cellular communication subsystem 210. For example, different combinations of the plurality of cellular antennas 250 may be used for different LTE bands. When communicating on a specific LTE band (e.g., B14), the plurality of tuning states for the plurality of antenna tuners 255 may be set to transform the impedances for all the active antennas, while setting the impedances for the inactive antennas to values that will not degrade the active antennas. The plurality of tuning states for the plurality of antenna tuners 255 may change when the transmission characteristics of the cellular communication subsystem 210 change. For example, the plurality of tuning states may change when the cellular communication subsystem 210 changes bands or sites.

In some embodiments, the transformed impedances (or tuning states) provided by the plurality of antenna tuners 255 are determined based on a plurality of tune codes. Some examples of tune codes for an LTE communication system include active tune codes, detune tune codes, and coexistence tune codes. Active tune codes properly match active LTE antennas for best performance. For example, antenna tuners for active LTE antennas can be programmed with a different active tune code whenever the LTE communication system switches to a different LTE band (e.g., B4, B15, etc.). Detune tune codes detune inactive LTE antennas so as not to degrade active LTE antennas. For example, when an LTE communication system is using B12, the diversity mid-band antenna is not being used, and hence its antenna tuner can be loaded with the detune code. Coexistence tune codes detune antennas that are shared with other wireless standards (e.g., Bluetooth, Wi-Fi, GNSS, etc.) when LTE is off (e.g., during a DRX cycle) to maximize performance at the frequency bands of the other wireless standards.

Each of the plurality of shunt switches 260 is coupled to one of the plurality of cellular antennas 250. Each of the plurality of shunt switches 260 is configured to electrically ground one of the plurality of cellular antennas 250. Each of the plurality of shunt switches 260 may include, for example, an electrical switch that selectively creates a low-resistance path to a reference terminal (e.g., a ground terminal) for input electrical current provided to one of the plurality of cellular antennas 250. In some embodiments, the plurality of shunt switches 260 are individually controlled by control signals generated by the application processor 225, the cellular modem 245, the baseband processor 215, the FM modem 235, or a combination thereof. The impedances of the plurality of cellular antennas 250 are fixed when electrically grounded by the plurality of shunt switches 260. On the other hand, when not electrically grounded by the plurality of shunt switches 260, the plurality of cellular antennas 250 can exhibit impedance changes which can interfere with the reception and transmission of audio signals by the FM communication subsystem 205. In the embodiment illustrated in FIG. 2, each one of the plurality of cellular antennas 250 is coupled to one of the plurality of shunt switches 260. In alternative embodiments, not all of the plurality of cellular antennas 250 are coupled to one of the plurality of shunt switches 260. For example, the FM antenna 240 may be more sensitive to impedance changes of the low-band antennas included in the plurality of cellular antennas 250. Thus, in some embodiments, the plurality of shunt switches 260 may only be coupled to the low-band antennas included in the plurality of cellular antennas 250.

The baseband processor 215 (an example of a "first electronic processor") obtains and provides information (for example, from the baseband memory 220, the FM modem 235, and the application processor 225) and processes the information by executing one or more software instructions or modules, capable of being stored, for example, in a random access memory ("RAM") area of the baseband memory 220, a read-only memory ("ROM") of the baseband memory 220, or another non-transitory computer readable medium (not shown). The software can include firmware, one or more applications, program data, filters, rules, one or more program modules, and other executable instructions. The baseband processor 215 is configured to retrieve from the baseband memory 220 and execute, among other things, software related to the control processes and methods described herein.

The baseband memory 220 can include one or more non-transitory computer-readable media, and includes a program storage area and a data storage area. The program storage area and the data storage area can include combinations of different types of memory, as described herein. The baseband memory 220 may take the form of any non-transitory computer-readable medium. In the embodiment illustrated, the baseband memory 220 stores, among other things, instructions for interference mitigation techniques (actions to mitigation interference in the FM communication subsystem 205 due to impedances changes in the cellular communication subsystem 210).

The application processor 225 (an example of a "second electronic processor") obtains and provides information (for example, from the application memory 230, the cellular modem 245, and the baseband processor 215) and processes the information by executing one or more software instructions or modules, capable of being stored, for example, in a RAM area of the application memory 230, a ROM of the application memory 230, or another non-transitory computer readable medium (not shown). The software can include firmware, one or more applications, program data, filters, rules, one or more program modules, and other executable instructions. The application processor 225 is configured to retrieve from the application memory 230 and execute, among other things, software related to the control processes and methods described herein.

The application memory 230 can include one or more non-transitory computer-readable media, and includes a program storage area and a data storage area. The program storage area and the data storage area can include combinations of different types of memory, as described herein. The application memory 230 may take the form of any non-transitory computer-readable medium. In the embodiment illustrated, the application memory 230 stores, among other things, instructions for interference mitigation techniques (actions to mitigation interference in the FM communication subsystem 205 due to impedances changes in the cellular communication subsystem 210).

The application processor 225 is coupled to the baseband processor 215 to receive signals therefrom (e.g., alert signals). In some embodiments, the communication link between the application processor 225 and the baseband processor 215 is configured to provide one-way communication between the application processor 225 and the baseband processor 215. For example, in the embodiment illustrated in FIG. 2, the application processor 225 may receive signals from the baseband processor 215, but the application processor 225 does not send signals to the baseband processor 215. In alternate embodiments, the communication link between the application processor 225 and the baseband processor 215 is configured to provide bi-directional communication between the application processor 225 and the baseband processor 215.

Figure 3:
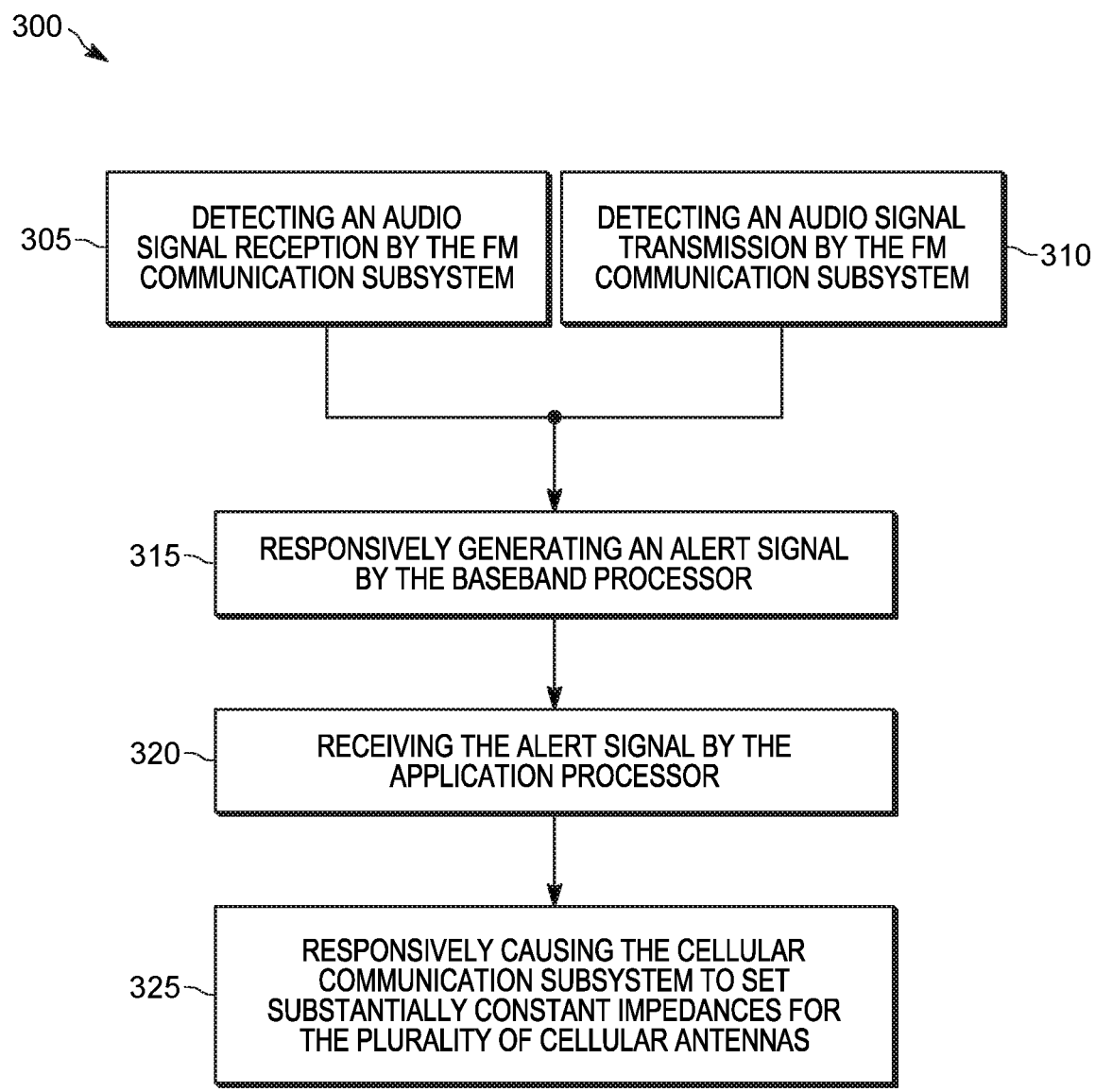
FIG. 3 is a flowchart of a method for controlling the portable communication device of FIG. 2 in accordance with some embodiments.

As described above, impedance changes in the plurality of cellular antennas 250 can impart audio ticks in audio signal receptions and audio signal transmissions by the FM communication subsystem 205. FIG. 3 is a flowchart of an example of a method 300 for controlling the portable communication device 200 to mitigate interference between the cellular communication subsystem 210 and the FM communication subsystem 205. In the example illustrated, the method 300 is implemented by a combination of the baseband processor 215 and the application processor 225.

At block 305, the baseband processor 215 detects an audio signal reception by the FM communication subsystem 205. As used herein, an "audio signal reception" refers to an FM signal reception by the FM communication subsystem 205 which causes the portable communication device 200 to produce an audible output. For example, the baseband processor 215 detects that the FM communication subsystem 205 receives, via the FM antenna 240, an FM signal including a voice communication which causes the portable communication device 200 to play an audible output via a speaker (not shown). The speaker is unmuted when the FM communication subsystem 205 receives an FM signal including audio. Thus, in some embodiments, the baseband processor 215 detects the audio signal reception by the FM communication subsystem 205 by detecting when the speaker is unmuted. In alternate embodiments, in order to detect the audio signal reception by the FM communication subsystem 205 sooner, the baseband processor 215 detects signaling data prepended to the audio signal reception. For example, the baseband processor 215 may detect dual-tone multi-frequency (DTMF) signals or Motorola data communication (MDC) signals that prepend the audio signal.

At block 310, the baseband processor 215 detects an audio signal transmission by the FM communication subsystem 205. As used herein, an "audio signal transmission" refers to an FM signal transmission which causes a separate communication device (not shown) to produce an audible output. For example, the baseband processor 215 detects that the FM communication subsystem 205 sends, via the FM antenna 240, an FM signal including a voice communication which causes another communication device that receives the FM signal to play an audible output via a speaker.

Responsive to detecting an audio signal reception by the FM communication subsystem 205 (at block 305) or an audio signal transmission by the FM communication subsystem 205 (at block 310), the baseband processor 215 generates an alert signal at block 315. At block 320, the application processor 225 receives the alert signal from the baseband processor 215.

Responsive to receiving the alert signal, at block 325, the application processor 225 causes the cellular communication subsystem 210 to set substantially constant impedances for the plurality of cellular antennas 250. For example, the impedances for the plurality of cellular antennas 250 are based in part on the plurality of tuning states of the plurality of antenna tuners 255. When the tuning state of one of the plurality of antenna tuners 255 changes (e.g., during a band change), the impedance of the respective one of the plurality of cellular antennas 250 may also change. Thus, in some embodiments, the application processor 225 causes the cellular communication subsystem 210 to set substantially constant impedances for the plurality of cellular antennas 250 by setting the plurality of antenna tuners 255 to fixed tuning states. As used herein, setting one of the plurality of antenna tuners 255 to a "fixed" tuning state refers to setting the one of the plurality of antenna tuners 255 to a constant tuning state that does not change due to, for example, band changes, site changes, or DRX cycles. Further, as used herein, setting the plurality of antenna tuners 255 to "fixed" tuning states does not require the tuning state for each of the plurality of antenna tuners 255 to be set to an identical tuning state.

While setting the plurality of antenna tuners 255 to fixed tuning states may mitigate impedances changes in the plurality of cellular antennas 250 caused by the plurality of antenna tuners 255, impedances changes of other components of the cellular communication subsystem 210 (or other components of the portable communication device 200) may also cause impedances changes in the plurality of cellular antennas 250. Thus, in some embodiments, in addition to setting the plurality of antenna tuners 255 to fixed tuning states, the plurality of antenna tuners 255 are set to predetermined fixed tuning states that prevent impedance changes in the plurality of cellular antennas 250 caused by other components of the cellular communication subsystem 210. For example, in some embodiments, the application processor 225 may set the antenna tuners 255 coupled to low-band antennas included in the plurality of cellular antennas 250 to predetermined fixed tuning states that set the low-band antennas to a high-isolation state. In the high-isolation state, the antenna tuners 255 isolate the low-band antennas from any impedance changes occurring upstream in the cellular communication subsystem 210. In some embodiments in which the plurality of cellular antennas 250 includes both mid-band antennas and high-band antennas, the application processor 225 may also set the antenna tuners 255 coupled to the mid-band antennas and the high-band antennas to predetermined fixed tuning states that set the mid-band antennas and high-band antennas to a predetermined state that allows cellular signal reception. In other words, the mid-band and high-band antennas are able to receive cellular signals, but unable to send cellular signals. In alternate embodiments in which the plurality of cellular antennas 250 includes dedicated mid-band/high-band antennas, the application processor 225 may also set the antenna tuners 255 coupled to the dedicated mid-band/high-band antennas to predetermined fixed tuning states that set the dedicated mid-band/high-band antennas to a predetermined state that allows both cellular reception and transmission.

In some implementations of the cellular communication subsystem 210, the supply voltages provided to some or all of the plurality of antenna tuners 255 are temporarily halted during state changes (e.g., band, DRX, and tuner) for power saving purposes. Changes in the supply voltages to the plurality of antenna tuners 255 may result in impedances changes in the plurality of cellular antennas 250. Thus, in addition to, or as an alternative to, the methods described above, the application processor 225 may cause the cellular communication subsystem 210 to set substantially constant impedances for the plurality of cellular antennas 250 by keeping the supply voltages provided to the plurality of antenna tuners 255 in an always ON state. As used herein, the "always ON state" refers to a state in which the supply voltages provided to the plurality of antenna tuners 255 are kept substantial constant and any voltage variations present are caused by component tolerances and process variations.

Keeping the supply voltages provided to the plurality of antenna tuners 255 in an always ON state stabilizes the power supply during state changes (e.g., band, DRX, and tuner) which mitigates impedance changes in the plurality of cellular antennas 250, and thus minimizing impedance changes in the FM antenna 240.

Band switching (e.g., LTE band switching) performed by the cellular modem 245 may also cause impedances changes in plurality of cellular antennas 250. Thus, in addition to, or as an alternative to, the methods described above, the application processor 225 may cause the cellular communication subsystem 210 to set substantially constant impedances for the plurality of cellular antennas 250 by configuring the cellular modem 245 to prevent band switching.

As described above, the impedance of one of the plurality of cellular antennas 250 is held substantially constant when electrically grounded by one of the plurality of shunt switches 260. Thus, in addition to, or as an alternative to, the methods described above, the application processor 225 may cause the cellular communication subsystem 210 to set substantially constant impedances for the plurality of cellular antennas 250 by setting the plurality of shunt switches 260 to electrically ground at least a subset of the plurality of cellular antennas 250. In some embodiments, the application processor 225 sets the plurality of shunt switches 260 to electrically ground all of the plurality of cellular antennas 250. In alternate embodiments, the application processor 225 sets the plurality of shunt switches 260 to electrically ground only a subset of plurality of cellular antennas 250. For example, the application processor 225 may set the plurality of shunt switches 260 to electrically ground only the low-band antennas included in the plurality of cellular antennas 250.

In addition to, or as an alternative to, the methods described above, the application processor 225 may cause the cellular communication subsystem 210 to set substantially constant impedances for the plurality of cellular antennas 250 by electrically disconnecting at least a subset of the plurality of cellular antennas 250 from the plurality of antenna tuners 255, the cellular modem 245, or both. In some embodiments, the subset of the plurality of cellular antennas 250 is electrically disconnected by a plurality of disconnect switches (not shown) coupled between, for example, the plurality of cellular antennas 250 and the plurality of antenna tuners 255.

In addition to, or as an alternative to, the methods described above, the application processor 225 may cause the cellular communication subsystem 210 to set substantially constant impedances for the plurality of cellular antennas 250 by placing the cellular communication subsystem 210 in an OFF state. As used herein, placing the cellular communication subsystem 210 in the "OFF state" includes placing the cellular communication subsystem 210 (or the portable communication device 200) in a state in which the cellular communication subsystem 210 cannot send or receive cellular signals. This may include placing the portable communication device 200 in "AIRPLANE mode" or turning the cellular communication subsystem 210 itself OFF.

In some embodiments, the application processor 225 continuously causes the cellular communication subsystem 210 to set substantially constant impedances for the plurality of cellular antennas 250 as long as the application processor 225 receives the alert signal from the baseband processor 215. In such embodiments, the baseband processor 215 may continuously generate the alert signal until the audio signal reception or the audio signal transmission is complete. In alternative embodiments, upon receiving the alert signal from the baseband processor 215, the application processor 225 continuously causes the cellular communication subsystem 210 to set substantially constant impedances for the plurality of cellular antennas 250 until the application processor 225 receives a second alert signal from the baseband processor 215. In such embodiments, the baseband processor 215 may generate the second alert signal when the audio signal reception or the audio signal transmission is complete. In some embodiments, upon receiving an indication from the baseband processor 215 that the audio signal reception or the audio signal transmission is complete, the application processor 225 continues to cause the cellular communication subsystem 210 to set substantially constant impedances for the plurality of cellular antennas 250 for a predetermined period of time following the completion of the audio signal reception or the audio signal transmission.

While the interference mitigation techniques described in the foregoing specification are described as being implemented by two electronic processors (i.e., baseband processor 215 and application processor 225), these interference mitigation techniques may also be implemented by additional electronic processors or a single electronic processor. For example, in some embodiments, the portable communication device 200 may include an electronic processor configured to detect at least one selected from a group consisting of an audio signal reception by the FM communication subsystem 205 and an audio signal transmission by the FM communication subsystem 205. The electronic processor is also configured to responsively cause the cellular communication subsystem 210 to set substantially constant impedances for the plurality of cellular antennas to mitigate interference between the cellular communication subsystem 210 and the FM communication subsystem 205.

While the interference mitigation techniques and architectures described in the foregoing specification are described as being for mitigating impedances changes that can impart audio ticks to audio signal receptions and transmissions of the FM communication subsystem 205, these interference mitigation techniques and architectures may also be used for mitigating interference for other types of signal receptions and transmissions of the FM communication subsystem 205. For example, the interference mitigation techniques and architectures described in the foregoing specification may also be used for mitigating interference during the reception and transmission of digital FM signals by the FM communication subsystem 205. As a further example, the interference mitigation techniques and architectures described in the foregoing specification may also be used for mitigating interference during the reception and transmission of data signals (e.g., P25, MDC, DTMF, etc.).

It should be noted that a plurality of hardware and software based devices, as well as a plurality of different structural components may be utilized to implement the disclosure. In some embodiments, the disclosure provides a software application that is executable on a personal computing device, such as a smart phone, tablet computer, smart watch, a portable radio, a body-worn camera device, and the like. In some embodiments, the software application may be stored and executed by a remote computing device, such as a server. In particular, the software application may be executed by a server, and a user can access and interact with the software application using a recognition device. Also, in some embodiments, functionality provided by the software application as described above may be distributed between a software application executed by a user's portable communication device and a software application executed by another electronic process or device (for example, a server) external to the recognition device. For example, a user can execute a software application (for example, a mobile application) installed on his or her smart device, which is configured to communicate with another software application installed on a server.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized electronic processors (or "processing devices") such as microprocessors, digital signal processors, customized processors and field programmable gate arrays (FPGAs) and unique stored program instructions (including both software and firmware) that control the one or more electronic processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (for example, comprising an electronic processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:
1. A portable communication device, comprising:
   a frequency-modulated (FM) communication subsystem including
      an FM modem, and
      at least one FM antenna coupled to the FM modem;
   a cellular communication subsystem including
      a plurality of cellular antennas,
      a plurality of antenna tuners coupled to the plurality of cellular antennas, and
      a cellular modem coupled to the plurality of antenna tuners;
   a first electronic processor coupled to the FM modem and configured to generate an alert signal responsive to detecting at least one selected from a group consisting of
      an audio signal reception by the FM communication subsystem, and
      an audio signal transmission by the FM communication subsystem; and
   a second electronic processor coupled to the first electronic processor and the cellular modem, the second electronic processor configured to
      receive the alert signal from the first electronic processor, and
      responsively cause the cellular communication subsystem to set substantially constant impedances for the plurality of cellular antennas to mitigate interference between the cellular communication subsystem and the FM communication subsystem.

2. The portable communication device of claim 1, wherein the FM communication subsystem includes a land-mobile radio (LMR) communication subsystem, and wherein the cellular communication subsystem includes a long-term evolution (LTE) communication subsystem.

3. The portable communication device of claim 1, wherein the second electronic processor is further configured to cause the cellular communication subsystem to set the substantially constant impedances for the plurality of cellular antennas by setting the plurality of antenna tuners to fixed tuning states.

4. The portable communication device of claim 3, wherein, when in the fixed tuning states, the plurality of antenna tuners are configured to prevent impedance changes in the plurality of cellular antennas caused by other components of the cellular communication subsystem.

5. The portable communication device of claim 4, wherein the plurality of cellular antennas includes low-band antennas, mid-band antennas, and high-band antennas, and wherein, when in the fixed tuning states, the plurality of antenna tuners are configured to
  set the low-band antennas to a high-isolation state, and
  set the mid-band antennas and the high-band antennas to a predetermined state that allows one of
    cellular signal reception and transmission, and
    cellular signal reception.

6. The portable communication device of claim 1, wherein the second electronic processor is further configured to cause the cellular communication subsystem to set the substantially constant impedances for the plurality of cellular antennas by keeping supply voltages of the plurality of antenna tuners in an always ON state.

7. The portable communication device of claim 1, wherein the second electronic processor is further configured to cause the cellular communication subsystem to set the substantially constant impedances for the plurality of cellular antennas by setting the cellular modem to prevent band switching.

8. The portable communication device of claim 1, wherein the cellular communication subsystem further comprising a plurality of shunt switches coupled to the plurality of cellular antennas, and wherein the second electronic processor is further configured to cause the cellular communication subsystem to set the substantially constant impedances for the plurality of cellular antennas by setting the plurality of shunt switches to electrically ground or electrically disconnect at least a subset of the plurality of cellular antennas.

9. The portable communication device of claim 1, wherein the second electronic processor is further configured to cause the cellular communication subsystem to set the substantially constant impedances for the plurality of cellular antennas by setting the cellular communication subsystem in an OFF state.

10. The portable communication device of claim 1, wherein the first electronic processor is further configured to detect the audio signal reception by the FM communication subsystem by detecting signaling data prepended to the audio signal reception.

11. A method for controlling a portable communication device including a frequency-modulated (FM) communication subsystem and a cellular communication subsystem, the method comprising:

detecting, by a first electronic processor of the portable communication device, at least one selected from a group consisting of
    an audio signal reception by the FM communication subsystem, and
    an audio signal transmission by the FM communication subsystem;
  responsively generating, by the first electronic processor, an alert signal;
  receiving, by a second electronic processor from the first electronic processor, the alert signal; and
  responsively causing, by the second electronic processor, the cellular communication subsystem to set substantially constant impedances for a plurality of cellular antennas included in the cellular communication subsystem to mitigate interference between the cellular communication subsystem and the FM communication subsystem.

12. The method of claim 11, wherein causing the cellular communication subsystem to set the substantially constant impedances for the plurality of cellular antennas includes setting a plurality of antenna tuners coupled to the plurality of cellular antennas to fixed tuning states.

13. The method of claim 12, wherein, when in the fixed tuning states, the plurality of antenna tuners preventing impedance changes in the plurality of cellular antennas caused by other components of the cellular communication subsystem.

14. The method of claim 13, wherein, when in the fixed tuning states, the plurality of antenna tuners setting low-band antennas included in the plurality of cellular antennas to a high-isolation state, and
  wherein, when in the fixed tuning states, the plurality of antenna tuners setting mid-band antennas and high-band antennas included in the plurality of cellular antennas to a predetermined state that allows one of
    cellular signal reception and transmission, and
    cellular signal reception.

15. The method of claim 11, wherein causing the cellular communication subsystem to set the substantially constant impedances for the plurality of cellular antennas includes keeping supply voltages of a plurality of antenna tuners coupled to the plurality of cellular antennas in an always ON state.

16. The method of claim 11, wherein causing the cellular communication subsystem to set the substantially constant impedances for the plurality of cellular antennas includes setting a cellular modem of the cellular communication subsystem to prevent band switching.

17. The method of claim 11, wherein causing the cellular communication subsystem to set the substantially constant impedances for the plurality of cellular antennas includes electrically grounding or electrically disconnecting at least a subset of the plurality of cellular antennas with a plurality of shunt switches coupled to the plurality of cellular antennas.

18. The method of claim 11, wherein causing the cellular communication subsystem to set the substantially constant impedances for the plurality of cellular antennas includes setting the cellular communication subsystem in an OFF state.

19. The method of claim 11, wherein detecting the audio signal reception by the FM communication subsystem includes detecting signaling data prepended to the audio signal reception.

20. A portable communication device, comprising:
  a frequency-modulated (FM) communication subsystem including an FM modem, and
at least one FM antenna coupled to the FM modem;
a cellular communication subsystem including
a plurality of cellular antennas,
a plurality of antenna tuners coupled to the plurality of cellular antennas, and
a cellular modem coupled to the plurality of antenna tuners;
a first electronic processor coupled to the FM modem and configured to generate an alert signal responsive to detecting at least one selected from a group consisting of
an audio or data signal reception by the FM communication subsystem, and
an audio or data signal transmission by the FM communication subsystem; and
a second electronic processor coupled to the first electronic processor and the cellular modem, the second electronic processor configured to
receive the alert signal from the first electronic processor, and
responsively cause the cellular communication subsystem to set substantially constant impedances for the plurality of cellular antennas to mitigate interference between the cellular communication subsystem and the FM communication subsystem.

* * * * *